United States Patent [19]

Watanabe

[11] 4,386,791
[45] Jun. 7, 1983

[54] ACTIVELY CONTROLLED SUSPENSION SYSTEM AND HEIGHT SENSOR

[75] Inventor: Shunso F. Watanabe, Livonia, Mich.

[73] Assignee: Ford Motor Company, Dearborn, Mich.

[21] Appl. No.: 280,760

[22] Filed: Jul. 6, 1981

[51] Int. Cl.³ .............................................. B60G 11/26
[52] U.S. Cl. ................................ 280/707; 267/64.21; 267/DIG. 1; 280/DIG. 1
[58] Field of Search ......... 280/707, 703, 772, DIG. 1; 267/64.21, 64.28, DIG. 1

[56] References Cited

U.S. PATENT DOCUMENTS

| | | | |
|---|---|---|---|
| 2,033,424 | 3/1936 | Geiskieng | 177/311 |
| 2,929,640 | 3/1960 | Faiver | 280/707 |
| 2,985,445 | 5/1961 | Bowser | 280/DIG. 1 |
| 3,181,853 | 5/1965 | Howell | 280/DIG. 1 |
| 3,277,256 | 10/1966 | Jones | 200/61.43 |
| 3,321,592 | 5/1967 | Miller | 200/61.43 |
| 3,593,269 | 7/1971 | Richardson | 340/58 |
| 3,710,050 | 1/1973 | Richards | 200/61.43 |
| 3,850,437 | 11/1974 | Owen | 267/64.21 |
| 3,920,940 | 11/1975 | Brown et al. | 200/61.43 |
| 4,033,423 | 7/1977 | Grasseau | 280/707 |
| 4,105,216 | 8/1978 | Graham et al. | 280/707 |

Primary Examiner—Joseph F. Peters, Jr.
Assistant Examiner—Ross Weaver
Attorney, Agent, or Firm—Joseph W. Malleck; Olin B. Johnson

[57] ABSTRACT

An actively controlled vehicular suspension system is disclosed. The system has at least one gas filled distensible suspension member to which is attached a distensible belt that changes curvature in relation to the curvature of the suspension member. The belt has V-shaped grooves spaced longitudinally along the belt each groove carrying metallic contacts which close a conductor path when a change in curvature of the belt closes the associated groove. The distensible suspension member is changed in pressure in response to the closing of the conductor path to adjust the suspension system.

10 Claims, 3 Drawing Figures

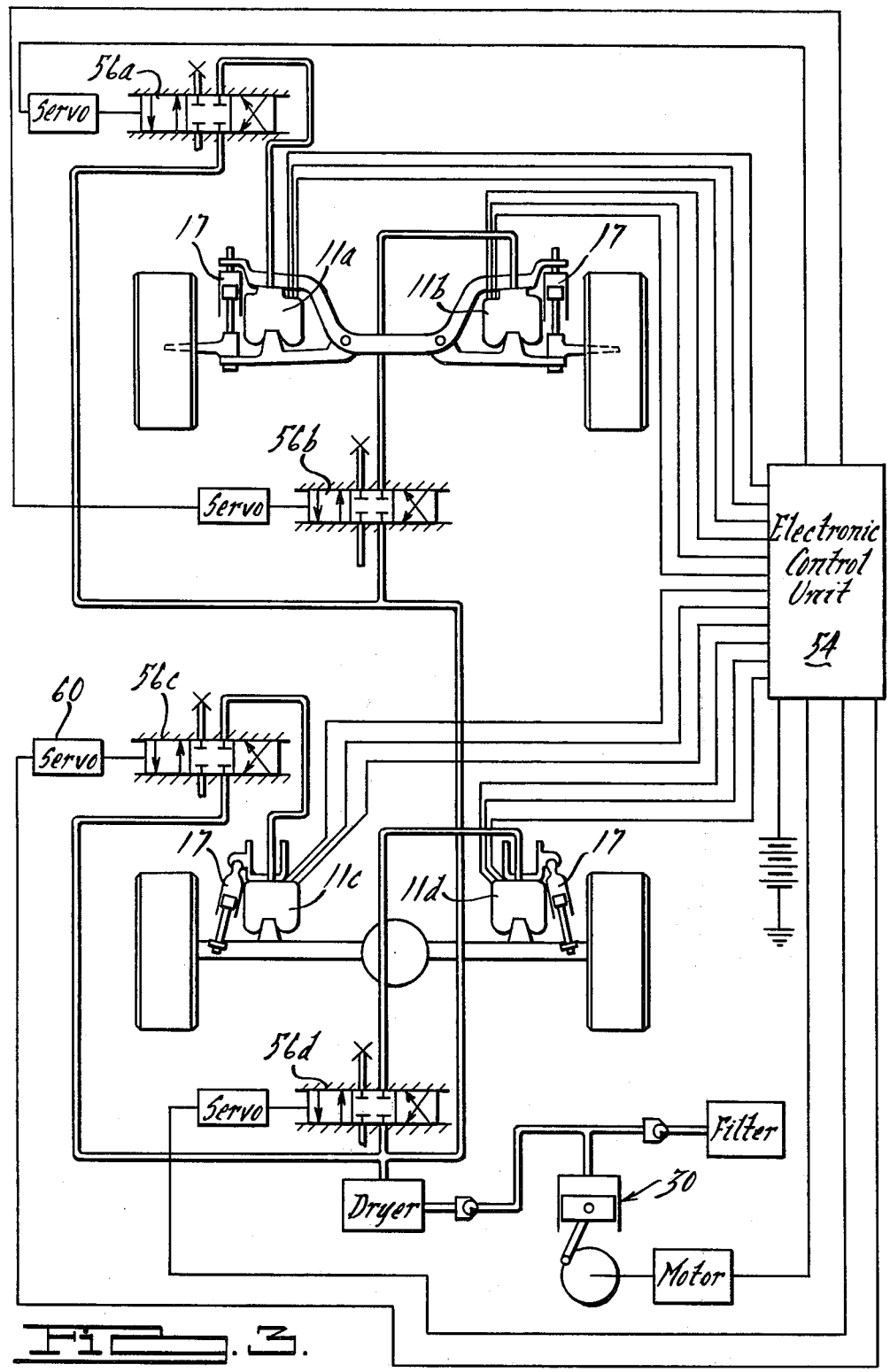

ACTIVELY CONTROLLED SUSPENSION SYSTEM AND HEIGHT SENSOR

BACKGROUND OF THE INVENTION

Automobiles are currently being made lighter and more fuel efficient with each new product change. A vast majority of these products use a suspension system which employs passive components, that is, the components are fixed suspension members that use springs, rubber or other equivalent resilient members to damp the movements between the chassis and the ground engaging support. These components are called passive because they do not change in their nature to accommodate varying loading conditions of the vehicle, which include passengers, cargo and moving road conditions such as bumps or rolls. The design flexibility for such passive components to accommodate the increasing reduction of weight has about reached its limit. Engineers are new turning to actively controlled suspension systems where the components change their cushioning or resilient nature at each of the wheels in response to dynamic conditions.

One type of actively controlled suspension system employs air springs, which are air bags located at each of the support stations adjacent the wheels of the vehicle. The system typically has an air actuator to change the pressure in the air bags in response to a height sensing device which indicates the height of the vehicle on the air bags and the necessity for adjustment in air pressure.

Height adjusting devices, when used with an actively controlled suspension system, have been of the mechanical type such as illustrated in U.S. Pat. Nos. 2,929,640; 4,033,423 and 4,105,216.

What is needed is some kind of a height sensor that is responsive to a change in the curvature of the distensible members which comprise the air bags. Although wires have been embedded in compressible rubber members (such as in U.S. Pat. Nos. 3,277,256; 3,321,592; 3,920,940 and 3,710,050), none of these structures would be helpful with distensible air bag suspension systems because they do not operate in connection with a device that expands or stretches, only with a device that receives an outside force to compress the resilient member. Electrical wires have been embedded in rubber automotive tires to indicate a flat or blowout condition as shown in U.S. Pat. Nos. 3,593,269 and 2,033,424. However, these teachings fail to provide a device which again would operate effectively with an air bag suspension system having distensible members which form extreme curvatures to provide the suspension operation.

SUMMARY OF THE INVENTION

The invention is an actively controlled vehicular suspension system which automatically adjusts or trims the standing or dynamic height of the suspension system. The invention is also directed to a height sensor used in such actively controlled suspension system.

The actively controlled suspension system comprises at least one gas filled distensible suspension member interposed between a suspended mass of the vehicle and a nonsuspended mass which is supported on ground engaging wheels. The suspension member has at least one curvilinear section that changes curvature in response to a change in pressure in the suspension member. The system also comprises means for changing the pressure in said distensible member and a height sensor responsive to a change in the curvature of said curvilinear section in response to a suspension load change to regulate the operation of the pressure changing means.

The preferred mode to define a curvilinear section is to form the air bag as a tubular section, one open end of the tube being joined to an upper boss attached to the sprung mass of the vehicle, and the other open end being folded inwardly and back upon itself to be attached to a lower boss carried by the unsprung mass of the vehicle. The folded section of the tubular distensible member provides a high degree of curvature, a change of which may be utilized by the height sensor as an indication of suspension load change.

It may be desirable to make the suspension system additionally responsive to a change in a hydraulic telescoping shock absorber arranged in parallel with the gas filled distensible member.

The height sensor preferably comprises a distensible belt advantageously joined to the interior surface of the curvilinear section of the distensible member and is effective to move therewith in response to changes in compression forces active on the extremities or ends of the member. The belt advantageously has a smooth inner face interrupted by one or more notches defined by converging walls, preferably in a V-shape configuration with the apex of the configuration spaced from the inner surface, the inner face engaging and flexing with the distensible member. The converging walls of the notch move together to eventually contact in response to a continued change in compression of the member ends and thereby an increase in curvature of said curvilinear section. Switch means, comprised of metallic contacts, are embedded in the edges of said converging walls remote from the apex, effective to be closed when a predetermined curvature of the curvilinear section is experienced. The belt also includes means responsive to the closing of said switch means to conduct a signal indicating a predetermined height of the suspension member has been reached. The latter is preferably comprised of graphite filaments embedded internally within the core of said belt, leading to an exterior station for connection to an electrically driven air pump effective to change the pressure in the distensible member.

It is most advantageous to employ a plurality of such notches in the distensible belt in a manner so that they are spaced along the curvilinear section at locations that experience different degrees of curvature change in response to pressure change. Thus, pairs of contacts can be mounted on the converging walls of each of these notches, one of the notches being located to operate to a closed condition in response to a large compression, another of said notches may be located so as to close in response to a middle compression condition, and still another located so as to close in response to a low compression condition. In this manner, the electrical signals can be transmitted to a microprocessing controller which can sort out the signals and arrange the air suspension bag to accommodate a variety of conditions the automobile is experiencing such as roll, momentary impact on one wheel, a momentary impact on one of the axles of the vehicle, or the loading and unloading of the vehicle.

To facilitate a higher degree of curvature during the operative sensing of the height detector, longitudinal grooves may also be formed in the inner face of the belt transverse to the notches which carry the electrical contacts. In this manner, the inner face may conform to much tighter curvatures before bringing the desired contacts together.

DESCRIPTION OF THE DRAWINGS

FIG. 3 is a schematic diagram of the active controls for the air bag suspension system of this invention, also illustrating in fragmentary elevational view a part of the suspension system at each wheel.

DETAILED DESCRIPTION

Figure 1:
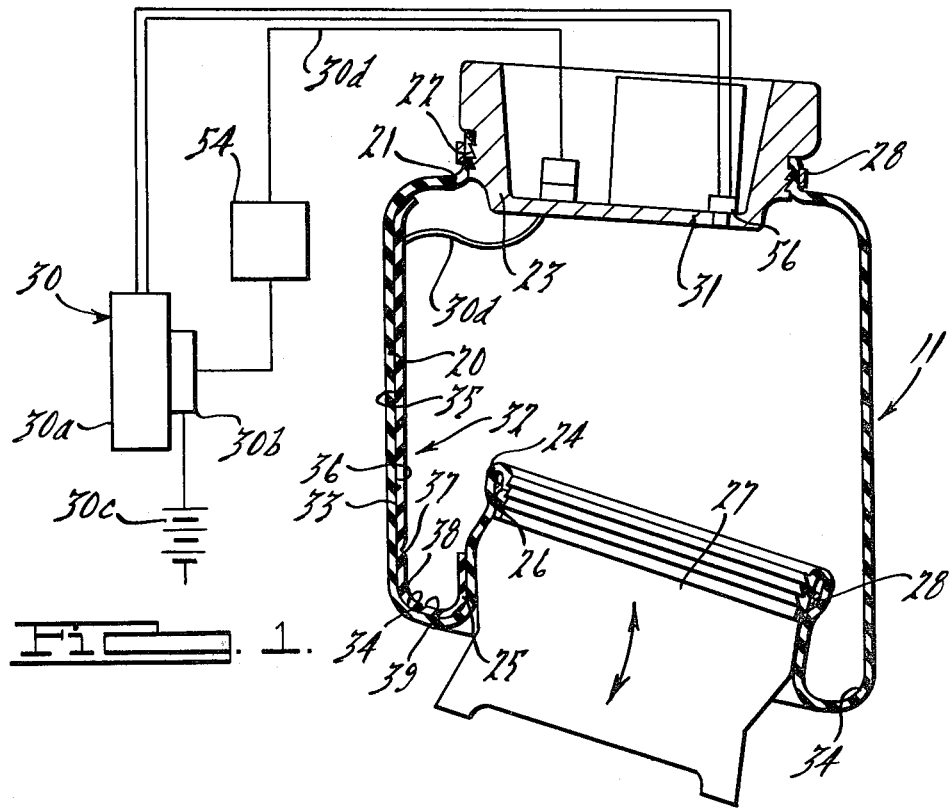
FIG. 1 is a central sectional view of a portion of a suspension system for an automotive vehicle embodying the principles of this invention.
Figure 2:
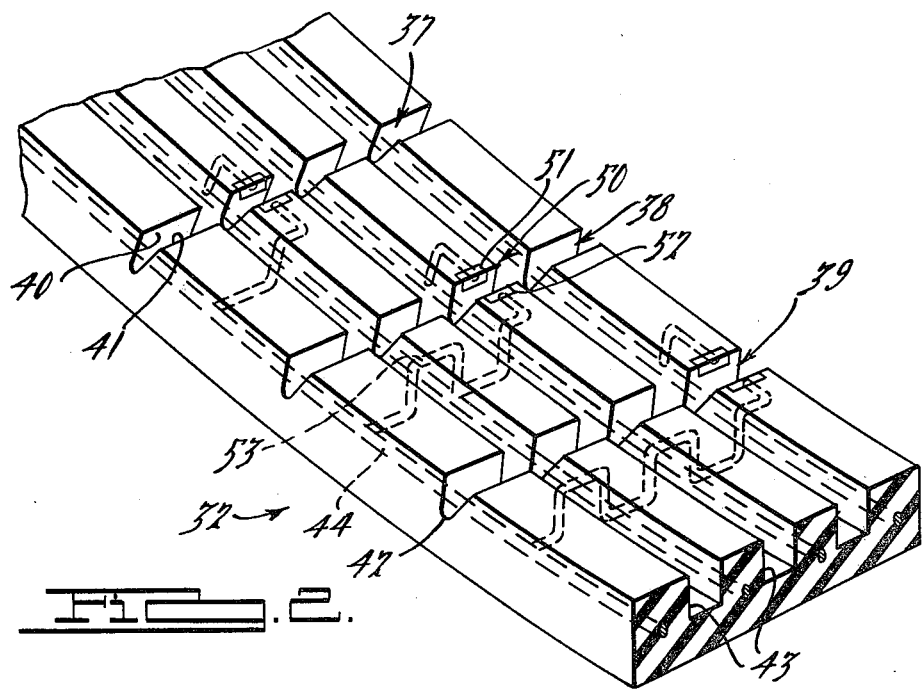
FIG. 2 is a fragmentary perspective view of a portion of the height sensor used in the system of FIG. 1.

As shown in FIG. 3, the preferred automotive suspension system 10 of this invention comprises at least one gas filled distensible suspension member 11 which is interposed between the vehicle's suspended mass 12 and the nonsuspended mass 13 which is supported on ground engaging wheels 14. The suspended mass 12 typically comprises a frame having an undulated arm 12a and other extended members which carry the passenger compartment of the vehicle. The nonsuspended mass 13 is typically comprised of the wheels 14 having a spindle 15 to which is attached a lower suspension arm 16 pivotally connected to the wheel spindle 15 and pivotally connected to another portion of the suspended mass 12. A MacPherson type strut 17 is also employed between the suspended and nonsuspended masses to operate in parallel with the gas filled distensible suspension member. The height sensor may be used in conjunction with other types of automotive suspension as well.

As shown in FIG. 1, the suspension member 11 has a distensible shell 20 which is comprised of rubber material. In this application it has a tubular configuration so that one end 21 of the tubular shape is fastened to a serrated surface 22 of the mounting boss 23 carried by the suspended mass; the other tubular end 24 is folded inwardly and backwardly at 25 upon itself and is similarly attached to a serrated portion 26 of a mounting boss 27 carried by the nonsuspended mass. A clamping band 28 may be employed to hold the ends of said tubular, rubberized member tightly to said bosses in a sealing condition so that air or other equivalent gases, such as nitrogen, may be prevented from passing thereby. In the application depicted, the tubular bag has about a 4" diameter at the bosses and will normally contain a pressure of 40-80 psi in the shape illustrated.

A gas charging means 30 for the distensible member comprises a suitable gas or air pump 30a effective to inject or eject gas at 31 from the member. It also includes a pump motor 30b, electrical conductors 30d, and a source of energy 30c for driving the motor. The height sensor 32 is used to control the actuation of the charging means.

The height sensor is a distensible belt 33 joined or bonded to a curvilinear section 34 of the member 20, the section being selected because it changes shape in response to the relative compression between bosses 23 and 27, which together act on the extremities of member 20. Switch means 50 is embedded in the belt to control the actuation of the charging means supplied with electricity through conductors also embedded in the belt.

The belt 33 moves with the section 34 in response to compression changes. The belt has a smooth outer face 35 bonded and engaged with the interior surface 36 of the distensible member, the face 35 being interrupted by one or more notches 37-38-39 which are defined therein. Each of the notches 37-38-39 have converging walls 40-41 which move together to contact each other when the boss 27 moves toward boss 23, causing the curvature of said distensible belt to change a predetermined degree. The notches are preferably V-shaped, spaced apart predetermind distances, and have the apex 42 of the V remote from surface 35. Here, the curvilinear section 34 has a rather high degree of curvature and upon the movement at boss 27 toward boss 23, it has been found that certain locations along the arc of such curvature will undergo a greater convergence of a notch at different amounts of compression than other notches. When the upper boss end 23 and lower boss end 27 move closer together to produce compression or "jounce", the folded section occurs nearer to the midsection of the tube, whereas when boss end 27 moves further from boss end 23 as in extension or "rebound", the folded section occurs nearer to the end.

Accordingly, a plurality of notches is employed, one notch 37 being located so that the upper edges of the notch will contact in response to a predetermined large compression of boss 27 toward boss 23, a second notch 38 is located so as to converge and contact when a medium compression or jounce is experienced (usually at the typical ride height) within the member, and a third notch 39 is located so that it will close when a predetermined light compression or extension of boss 27 relative to boss 23 is experienced. To facilitate the notches closing in response to a change in curvature and not be disrupted by transverse ripples or waves in the distensible member, longitudinally extending and spaced grooves 43 may be employed to facilitate freedom of such change in curvature.

Graphite filaments 44 are embedded in the rubber belt to act as part of the electrical conductors 30d. Metallic contacts 51-52 of switch means 50 are embedded in the upper edges 40-41 of each converging wall for the notches, the contacts being in electrical communication with a graphite filament. The contacts, as well as crossover leads 53, can be made of copper or other suitable material. The contacts normally interrupt electrical connection between the pump motor and source until closed by convergence of the notch due to a compression or jounce. It is desirable to insert a microprocessor controller 54 across all of the conductors to receive the electrical signals, and to interpret and decide when the pump should be actuated or air withdrawn. The microprocessor may be mounted within the passenger compartment, engine compartment, or other areas which provide the proper environment as to temperature and mechanical stress for such device.

Turning now to FIG. 4, the control for an actively controlled suspension system in accordance with this invention is shown. Four air suspension members 11a-11d are employed, each being associated with a ground wheel of the vehicle and each having a MacPherson strut (shock absorber) 17 associated therewith in parallel. A valve 56 (actuated by a servo mechanism 60) is used to regulate the transmission of air to each strut and air spring from a compressed air supply 30 associated with a dryer and filter. Each of the valves (56a through 56d) has three positions, one which blocks communication of air, the other provides for passage of air therethrough, and another provides for venting of the passage.

A microprocessing mechanism 54 receives signals from each of the air bags (indicating the degree of compression therein) and from each of the struts. The information is digested by the microprocessor and compared to values for known static and dynamic conditions of loading, roll, stop, etc. The microprocessor can inject air into one of the struts and air bags to adjust the conditions therein.

I claim:

1. An actively controlled suspension system, comprising:
   a vehicle having a suspended mass;
   a nonsuspended mass supported on ground engaging wheels of said vehicle;
   suspension means having at least one gas filled distensible suspension member interposed between said masses and including at least one curvilinear section;
   means for changing the pressure in said distensible member comprising an electrically operated gas pump and electrical conductors connecting an energy source with said gas pump;
   a height sensor responsive to a change in the curvature of said curvilinear section in response to a compression change to thereby regulate the operation of said pressure changing means, said height sensor comprising a distensible rubber belt mounted to said distensible suspension member, said belt having switching means carried by opposite converging walls of notches in said belt and effective to normally interrupt said electrical conductors and to close said electrical conductors upon a predetermined change in shape of said curvilinear section.

2. A height sensor for a gas filled suspension member having at least one curvilinear section that changes curvature in response to the degree of compression of said member, comprising:
   a distensible belt joined to said curvilinear section to move therewith in response to compression changes;
   walls in the surface of said belt, which surface is remote from the surface of said belt that meets with said section, to define at least one notch, said walls moving together to close said notch in response to an increase in compression of said member, which causes an increase in the curvature of said curvilinear section;
   switch means mounted on said walls of said notch effective to be closed when a predetermined curvature of said curvilinear section is obtained; and
   means responsive to the closing of said switch means to indicate a predetermined height of said suspension member.

3. The height sensor as in claim 2, in which the walls of said notch converge and said surface of said distensible belt is smooth except where interrupted by said notch.

4. The height sensor as in claim 3, in which the surface of said belt without notches is bonded to the interior surface of the said suspension member.

5. The height sensor as in claim 5, in which said walls define a plurality of notches spaced along said curvilinear section at locations that experience different degrees of curvature change in response to a change of compression, said switch means having pairs of contacts mounted on the engageable walls of said plurality of notches, a first pair of said contacts being effective to be closed when a predetermined degree of compression is experienced within said suspension member, another pair of said contacts being effective to be closed when a predetermined higher degree of compression is experienced in said suspension member, and a third pair of said contacts being effective to be closed when a predetermined lower degree of compression is experienced within said suspension member, said responsive means causing said member to be inflated to different degrees, depending on which contacts are closed.

6. The height sensor as in claim 2, in which said responsive means comprises electrical conductors embedded in said belt connecting an energy source with an electrically operated gas pump capable of inflating or deflating said suspension member.

7. The height sensor as in claim 6, in which said conductors comprise graphite filaments.

8. The height sensor as in claim 3, in which said notches have V-shaped configurations with converging walls meeting at the apex of said configuration spaced from said member.

9. The height sensor as in claim 8, in which the electrical contacts are embedded in edges of said walls remote from said apex.

10. The height sensor as in claim 1, in which said belt has grooves transverse to said notches to permit improved flexing of said notch walls in response to pressure change.

* * * * *